United States Patent
Adam et al.

(10) Patent No.: US 11,288,360 B2
(45) Date of Patent: Mar. 29, 2022

(54) PREVENTING UNTRUSTED SCRIPT EXECUTION

(71) Applicant: Kyndryl, Inc., New York, NY (US)

(72) Inventors: Constantin Mircea Adam, Fairfield, CT (US); Richard Jay Cohen, Austin, TX (US); Jeffrey Edward Lammers, Cleveland, OH (US); Cheng Yi Lee, Singapore (SG); Brian Peterson, Ridgefield, CT (US); Maja Vukovic, New York, NY (US); Xiongfei Wei, Singapore (SG)

(73) Assignee: KYNDRYL, INC., New York, NY (US)

( * ) Notice: Subject to any disclaimer, the term of this patent is extended or adjusted under 35 U.S.C. 154(b) by 66 days.

(21) Appl. No.: 16/808,590

(22) Filed: Mar. 4, 2020

(65) Prior Publication Data

US 2021/0279326 A1 Sep. 9, 2021

(51) Int. Cl.
*G06F 21/00* (2013.01)
*G06F 21/51* (2013.01)
*H04L 9/30* (2006.01)
*H04L 9/32* (2006.01)

(52) U.S. Cl.
CPC ............. *G06F 21/51* (2013.01); *H04L 9/30* (2013.01); *H04L 9/3239* (2013.01); *G06F 2221/033* (2013.01)

(58) Field of Classification Search
CPC . G06F 2221/033; G06F 21/51; H04L 9/3239; H04L 9/30
See application file for complete search history.

(56) References Cited

U.S. PATENT DOCUMENTS

| | | | |
|---|---|---|---|
| 8,850,193 B2 | 9/2014 | Fanton et al. | |
| 2003/0141959 A1 | 7/2003 | Keogh et al. | |
| 2005/0183072 A1 | 8/2005 | Horning et al. | |
| 2007/0288763 A1* | 12/2007 | Grynberg | G06F 21/125 713/190 |
| 2011/0202996 A1* | 8/2011 | Monsifrot | G06F 11/28 726/22 |
| 2012/0278634 A1* | 11/2012 | Luukkala | G06F 21/6245 713/189 |
| 2012/0317421 A1 | 12/2012 | Gounares | |
| 2014/0223580 A1 | 8/2014 | Neivanov et al. | |
| 2016/0162686 A1 | 6/2016 | Nam et al. | |
| 2018/0241568 A1 | 8/2018 | Schilder et al. | |
| 2021/0029100 A1* | 1/2021 | Bendersky | H04L 63/0861 |

OTHER PUBLICATIONS

Redhat, 2.8. Signing Kernel Modules for Secure Boot, 2019, https://access.redhat.com/documentation/en-US/Red_Hat_Enterprise_Linux/7/html/Kernel_Administration_Guide/sect-signing-kernel-modules-for-secure-boot.html.

* cited by examiner

*Primary Examiner* — Ghazal B Shehni
(74) *Attorney, Agent, or Firm* — Garg Law Firm, PLLC; Rakesh Garg; Ken Han

(57) ABSTRACT

Using a first key, an encrypted file fingerprint is decrypted, the decrypting resulting in a decrypted file fingerprint. Using a hash function on a script file, a script file fingerprint is computed, the script file intended to be executed by an interpreter. Responsive to the script file fingerprint matching the decrypted file fingerprint, the script file is executed.

20 Claims, 9 Drawing Sheets

US 11,288,360 B2

PREVENTING UNTRUSTED SCRIPT EXECUTION

TECHNICAL FIELD

The present invention relates generally to a method, system, and computer program product for file integrity control. More particularly, the present invention relates to a method, system, and computer program product for preventing untrusted script execution.

BACKGROUND

Software is typically written in human-readable source code, in a particular computer language. In a compiled computer language or an assembly language, a compiler or assembler is used to convert the source code into machine code to be executed by a processor at a later time. Two non-limiting examples of compiled computer languages are C and C++. In an interpreted computer language, an interpreter converts a unit of source code (e.g. one line or one command) at a time, and a processor executes the conversion result, before moving on to converting and executing the next unit of code. Some non-limiting examples of interpreted computer languages are Ruby and JavaScript. (JavaScript is a registered trademark of Sun Microsystem, Inc. in the United States and other countries.) Some computer languages (e.g., Python) can be compiled or interpreted. (Python is a registered trademark of the Python Software Foundation in the United States and other countries.) In addition, some applications have a compiled component and an interpreted component. Source code for an interpreted language is also referred to as a script. A script is typically stored in one or more script files. A script may also use one or more packages or libraries, which include commonly-used functionality. Using such packages avoids the need to re-implement common functionality in every script.

A fingerprinting algorithm maps an arbitrarily large data item (such as a computer file) to a much shorter bit string, or fingerprint, that uniquely identifies the original data for all practical purposes. This process is also referred to as file fingerprinting. Fingerprints are typically used to efficiently check whether a file has been modified, by comparing a current fingerprint of the file with a previous fingerprint. If the fingerprints match, the corresponding files must also match. Fingerprinting typically uses a hash function, an algorithm that maps data of arbitrary size to a bit string of a fixed size. The hash function is chosen to yield a probability under a particular threshold that two different files will yield the same fingerprint. Thus, the output bit string is also referred to as a hash value or hash. Some common hash functions include algorithms in the Secure Hash Algorithm 2 (SHA-2) family, such as SHA-256 and SHA-512.

Public-key cryptography, or asymmetric cryptography, is a cryptographic system that uses a pair of keys: a public key which can be distributed without compromising security, and a private key known only to the key's owner. Data is encrypted using one of the keys and decrypted with the other key. In such a system, a message's integrity can be verified by encrypting the message with the sender's private key, and the message's integrity verified by anyone who has access to the sender's public key. Alternatively, anyone can encrypt a message using the receiver's public key, but the encrypted message can only be decrypted with the receiver's private key. Algorithms for generating key pairs, encryption and decryption, and distributing keys are widely known.

SUMMARY

The illustrative embodiments provide a method, system, and computer program product. An embodiment includes a method that decrypts, using a first key, an encrypted file fingerprint, the decrypting resulting in a decrypted file fingerprint. An embodiment computes, using a hash function on a script file, a script file fingerprint, the script file intended to be executed by an interpreter. An embodiment executes, responsive to the script file fingerprint matching the decrypted file fingerprint, the script file.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
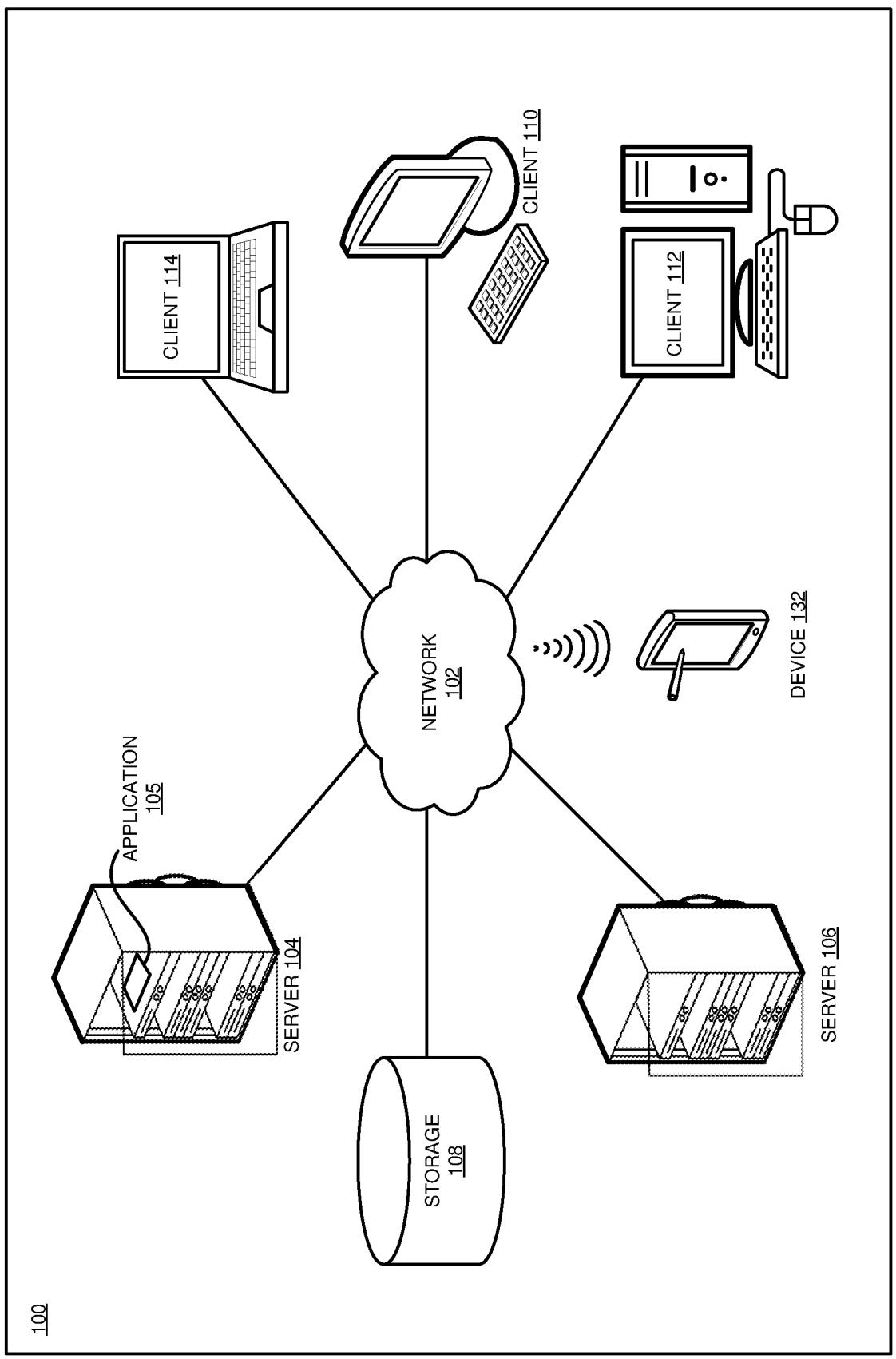
FIG. 1 depicts a block diagram of a network of data processing systems in which illustrative embodiments may be implemented.

The illustrative embodiments recognize that some computer applications require special system administration privileges. For example, modifying operating system files to install certain applications or update or repair portions of the operating system, moving operating system files into or out of expected storage locations for those files, granting or revoking user accounts and privileges, mounting and unmounting file systems, and other system administration tasks all typically require special privileges not available to ordinary users, because of the potential for rendering the operating system or even the underlying hardware unstable or nonfunctional for all users. Such privileges are referred to as superuser privileges or root privileges, and the applications using such privileges are referred to as privileged or trusted applications. Privileged or trusted applications run in a privileged or trusted environment.

The illustrative embodiments also recognize that, because of the greater potential for operating system harm, privileged applications are targets for malfeasance. For example, viruses or other malware can modify executable file components of a trusted operating system application, producing unwanted results when the application is executed. Virus scanners and other malware detection methods are presently available to monitor executable file components of a trusted operating system application, alerting system administrators of any errors and attempting to repair such errors.

The illustrative embodiments also recognize that malware detection methods operate on executable files resulting from compiled source code. However, scripts written for interpreter execution do not have executable files that can be monitored using presently-available malware detection methods.

One example of a trusted script runs periodically to monitor a system for compliance with a set of security compliance rules, such as aging requirements for passwords and which file transfer protocols are allowed. Because the script must have access to operating system resources such as password configuration settings, it must execute in a trusted environment. However, because the script executes in a trusted environment, it is also a target for inappropriate modification. Such inappropriate modification would be difficult to detect and could harm the system on which the script executes. Consequently, the illustrative embodiments recognize that there is an unmet need to determine that a script file executing in a trusted environment is a trusted script file, and allow execution of only trusted script files.

The illustrative embodiments recognize that the presently available tools or solutions do not address these needs or provide adequate solutions for these needs. The illustrative embodiments used to describe the invention generally address and solve the above-described problems and other problems related to preventing untrusted script execution.

An embodiment can be implemented as a software application. The application implementing an embodiment can be configured as a modification of an existing script interpretation and execution system, as a separate application that operates in conjunction with an existing script interpretation and execution system, a standalone application, or some combination thereof.

Particularly, some illustrative embodiments provide a method that decrypts an encrypted file fingerprint, uses a hash function on a script file to compute a script file fingerprint, and compares the two fingerprints. If the two fingerprints match, the method executes the script file. If the two fingerprints do not match, the method prevents the script file from executing.

An embodiment receives a deployment package including one or more trusted script files. The deployment package also includes, for each trusted script file, a corresponding script file fingerprint. To compute a script file fingerprint, a packaging application uses a hash function on a trusted script file, obtaining a bit string of a fixed size—the fingerprint. The hash function can be any suitable hash function, many of which are presently known. The packaging application stores all of the script file fingerprints in a fingerprint file, encrypts the fingerprint file using a cryptographic key, and adds the encrypted fingerprint file to the deployment package. In one version of the packaging application, the fingerprint file is encrypted using the private key of a public-private key pair, and the public key of the pair is also included in the deployment package. The deployment package performs the encryption using any suitable encryption method, techniques for which are presently known.

An embodiment decrypts the received, encrypted fingerprint file. One embodiment uses the public key received in the deployment package or via another means to decrypt the fingerprint file. Another embodiment uses a cryptographic key obtained using a different method to decrypt the fingerprint file. A cryptographic key obtained using a different method need not be the public key of a public-private key pair. An embodiment performs the decryption using any suitable decryption method, techniques for which are presently known. One embodiment stores contents of the decrypted fingerprint file in a repository, for example a file, for use at a later time. Another embodiment maintains the fingerprint file in encrypted form, and decrypts the fingerprint file when required for use.

When a script file is presented to an embodiment for interpretation and execution, the embodiment uses a hash function to compute a fingerprint of the script file. The hash function can be any suitable hash function, many of which are presently known, but must be the same function as was used to generate fingerprints in the received fingerprint file.

An embodiment checks the fingerprint repository for a fingerprint matching the script file fingerprint. In one embodiment, the fingerprint repository includes a whitelist of allowed script file names, and each entry in the whitelist has a corresponding fingerprint. If the name of the script file matches a filename in the whitelist, and the filename's corresponding fingerprint matches the script file fingerprint, the script file has not been modified since being received, and can still be trusted. Consequently, the embodiment executes the now-trusted script file. On the other hand, if there is no filename in the whitelist matching the name of the script file, or if the fingerprints do not match, the script file cannot be trusted and is prevented from execution.

In another embodiment, the fingerprint repository does not include a whitelist of allowed script file names. This embodiment compares each fingerprint in the repository with the script file fingerprint. If a fingerprint in the repository matches the script file fingerprint, the script file has not been modified since being received, and can still be trusted. Consequently, the embodiment executes the now-trusted script file. On the other hand, if there is no matching fingerprint in the repository, the script file cannot be trusted and is prevented from execution.

If a script file uses a package stored in a file, an embodiment uses a hash function to compute a fingerprint of the package file and checks the fingerprint repository for a fingerprint matching the script file fingerprint in a manner described herein. If a fingerprint in the repository matches the package file fingerprint, the package file has not been modified and can still be trusted. Consequently, the embodiment executes the now-trusted package file. On the other hand, if there is no matching fingerprint in the repository, the package file cannot be trusted and is prevented from execution.

If a script or package file is found untrustworthy and prevented from execution, one embodiment logs the event for further investigation. Non-limiting examples of further investigation include determining the source of the untrustworthy file and analyzing the file to determine results of its execution. If a script or package file is found untrustworthy and prevented from execution, another embodiment generates an alert to notify a system administrator of the event, allowing the administrator to determine whether the event warrants further investigation. Non-limiting examples of an alert include an email or text message to a designated address and a notification within a system management interface.

The manner of preventing untrusted script execution described herein is unavailable in the presently available methods in the technological field of endeavor pertaining to script file execution. A method of an embodiment described herein, when implemented to execute on a device or data processing system, comprises substantial advancement of the functionality of that device or data processing system in decrypting an encrypted file fingerprint, using a hash function on a script file to compute a script file fingerprint, and executing the script file only if the two fingerprints match The illustrative embodiments are described with respect to certain types of cryptographic keys, scripts, hash functions, fingerprints, encryptions, decryptions, operating system, interpreters, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
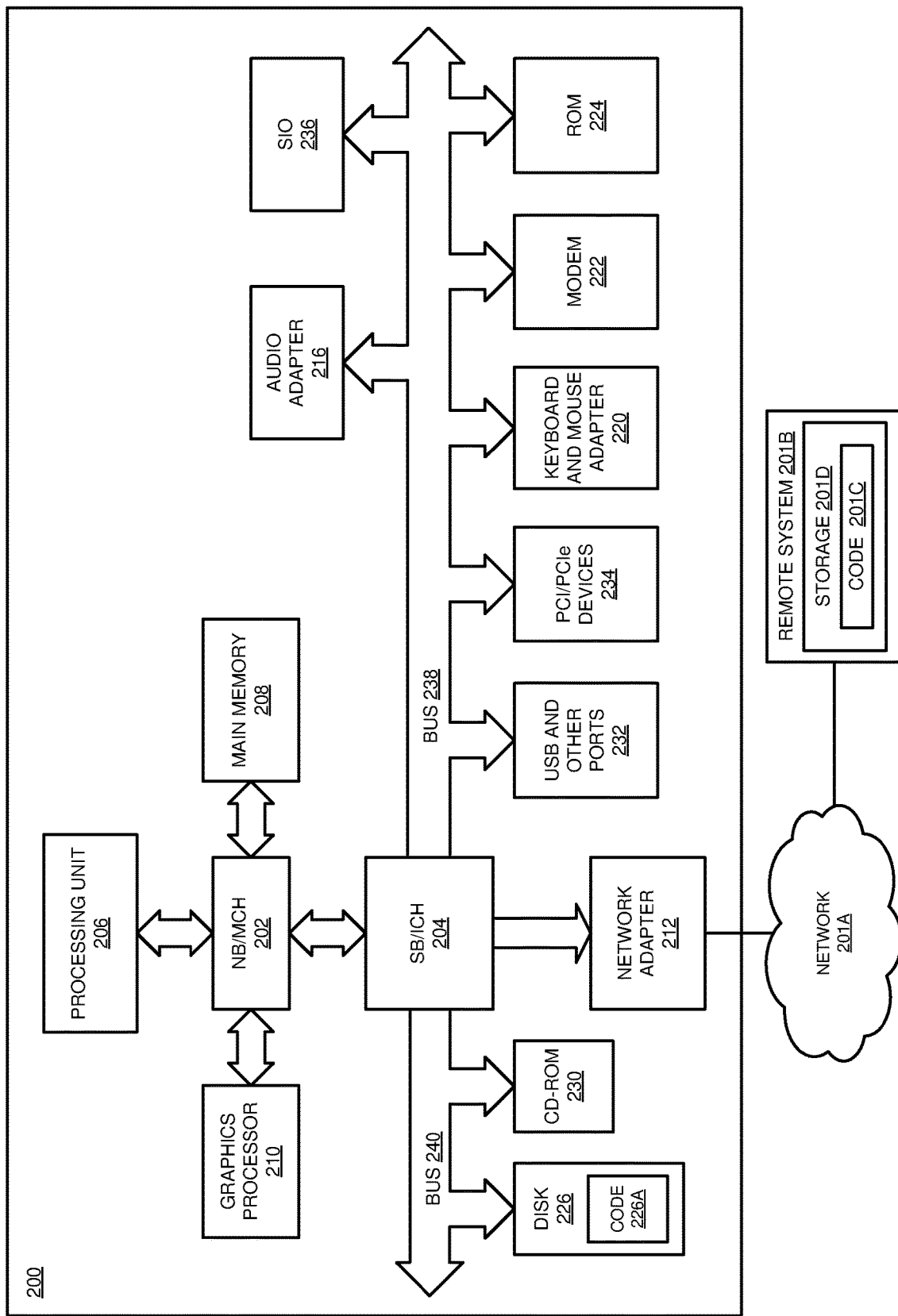
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
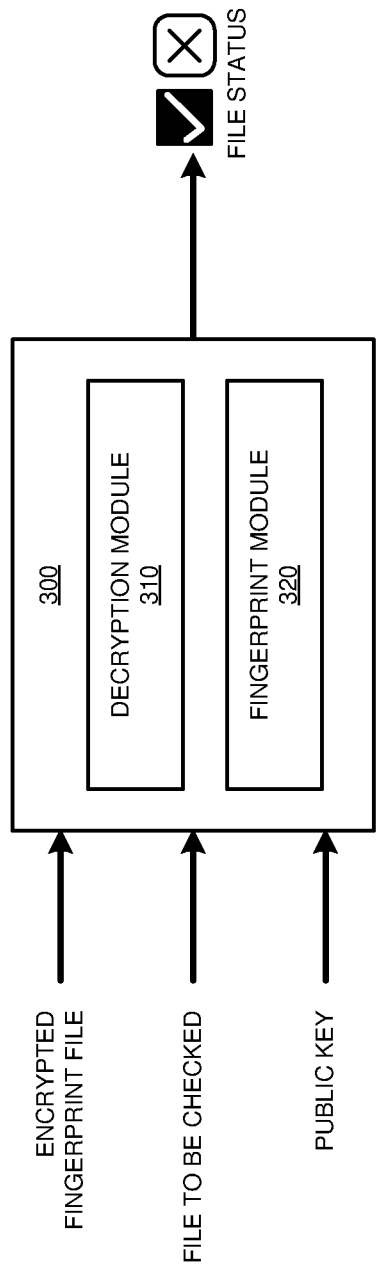
FIG. 3 depicts a block diagram of an example configuration for preventing untrusted script execution in accordance with an illustrative embodiment.

With reference to FIG. 3, this figure depicts a block diagram of an example configuration for preventing untrusted script execution in accordance with an illustrative embodiment. Application 300 is an example of application 105 in FIG. 1 and executes in any of servers 104 and 106, clients 110, 112, and 114, and device 132 in FIG. 1. Decryption module 310 decrypts a received, encrypted fingerprint file. One implementation of module 310 uses a public key, received in a deployment package or via another means, to decrypt the fingerprint file. Another implementation of module 310 uses a cryptographic key obtained using a different method to decrypt the fingerprint file. Module 310 performs the decryption using any suitable decryption method. One implementation of application 300 stores contents of the decrypted fingerprint file in a repository, for example a file, for use at a later time. Another implementation of application 300 maintains the fingerprint file in encrypted form, and module 310 decrypts the fingerprint file when required for use.

When a script file is presented to an embodiment for interpretation and execution, fingerprint module 320 uses a hash function to compute a fingerprint of the script file. The hash function can be any suitable hash function, many of which are presently known, but must be the same function as was used to generate fingerprints in the received fingerprint file.

Fingerprint module 320 checks the fingerprint repository for a fingerprint matching the script file fingerprint. In one implementation of module 320, the fingerprint repository includes a whitelist of allowed script file names, and each entry in the whitelist has a corresponding fingerprint. If the name of the script file matches a filename in the whitelist, and the filename's corresponding fingerprint matches the script file fingerprint, the script file has not been modified since being received, and can still be trusted. Consequently, application 300 executes the now-trusted script file. On the other hand, if there is no filename in the whitelist matching the name of the script file, or if the fingerprints do not match, the script file cannot be trusted and is prevented from execution.

In another implementation of module 320, the fingerprint repository does not include a whitelist of allowed script file names. This implementation compares each fingerprint in the repository with the script file fingerprint. If a fingerprint in the repository matches the script file fingerprint, the script file has not been modified since being received, and can still be trusted. Consequently, application 300 executes the now-trusted script file. On the other hand, if there is no matching fingerprint in the repository, the script file cannot be trusted and is prevented from execution.

Figure 4:
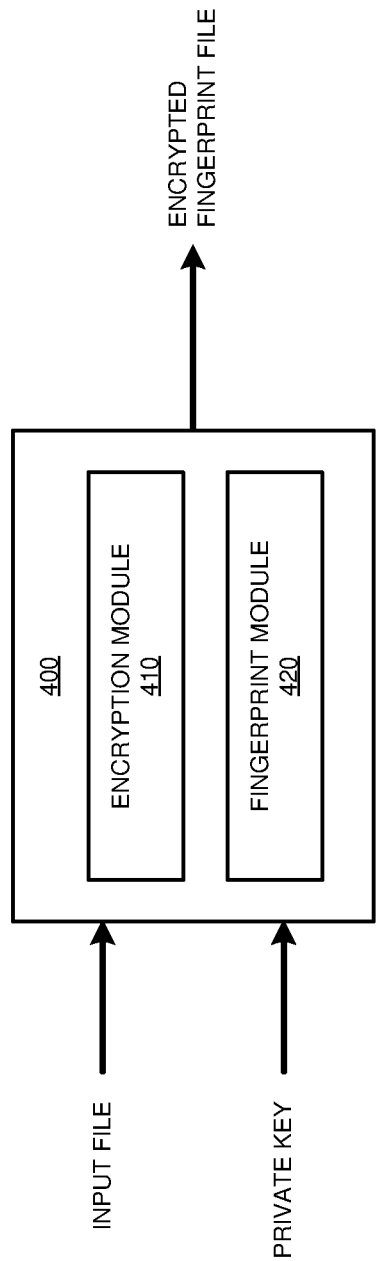
FIG. 4 depicts a block diagram of an example configuration for use in preventing untrusted script execution in accordance with an illustrative embodiment.

With reference to FIG. 4, this figure depicts a block diagram of an example configuration for use in preventing untrusted script execution in accordance with an illustrative embodiment. Application 400 is an example of application 105 in FIG. 1 and executes in any of servers 104 and 106, clients 110, 112, and 114, and device 132. in FIG. 1.

In particular, application 400 generates an encrypted fingerprint file, including script file fingerprints corresponding to one or more trusted script files. To compute a script file fingerprint, fingerprint module 420 uses a hash function on a trusted script file, obtaining a bit string of a fixed size—the fingerprint. The hash function can be any suitable hash function, many of which are presently known. Application 400 stores all of the script file fingerprints in a fingerprint file. Encryption module 410 encrypts the fingerprint file using a cryptographic key, using any suitable encryption method, techniques for which are presently known. In one implementation of application 400, the fingerprint file is encrypted using the private key of a public-private key pair, and the public key of the pair is also included in the deployment package.

Figure 5:
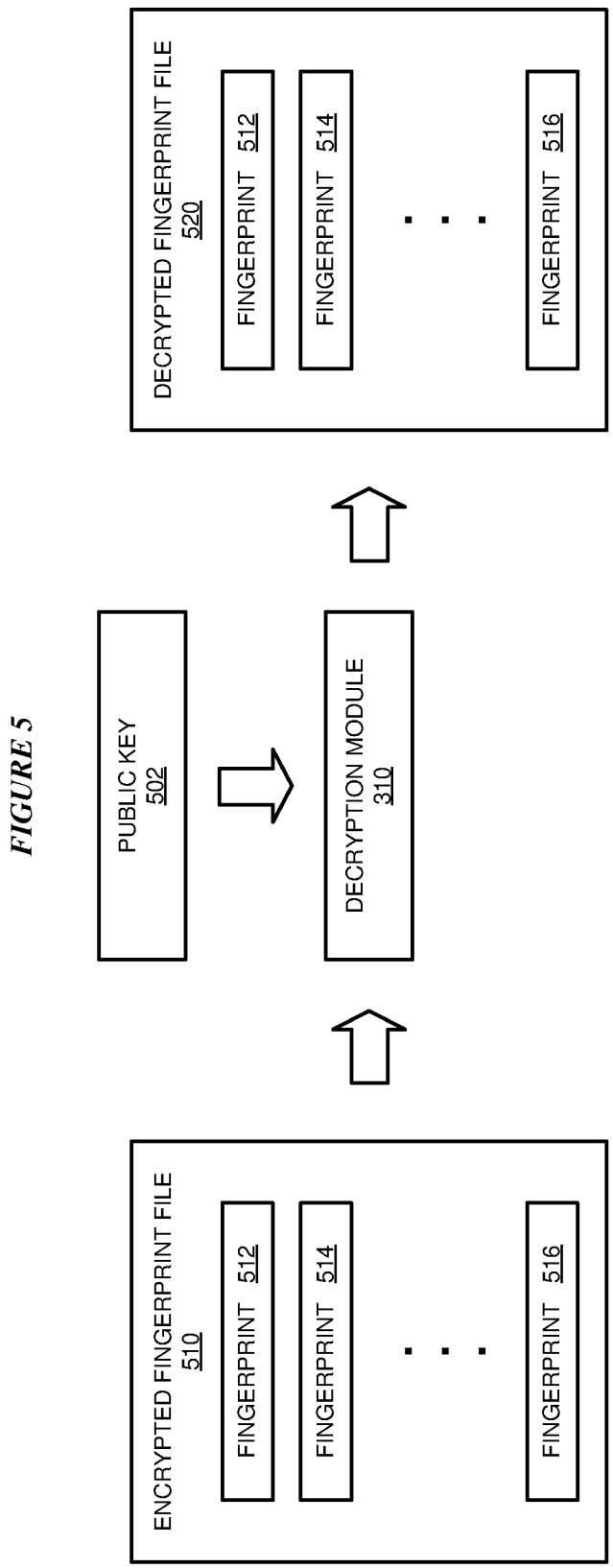
FIG. 5 depicts an example configuration of preventing untrusted script execution in accordance with an illustrative embodiment.

With reference to FIG. 5, this figure depicts an example configuration of preventing untrusted script execution in accordance with an illustrative embodiment. The example can be executed using application 300 in FIG. 3. Decryption module 310 is the same as decryption module 310 in FIG. 3.

As depicted, encrypted fingerprint file 510 includes fingerprints 512, 514, and 516. Decryption module 310 uses public key 502 to decrypt fingerprint file 510, resulting in decrypted fingerprint file 520.

Figure 6:
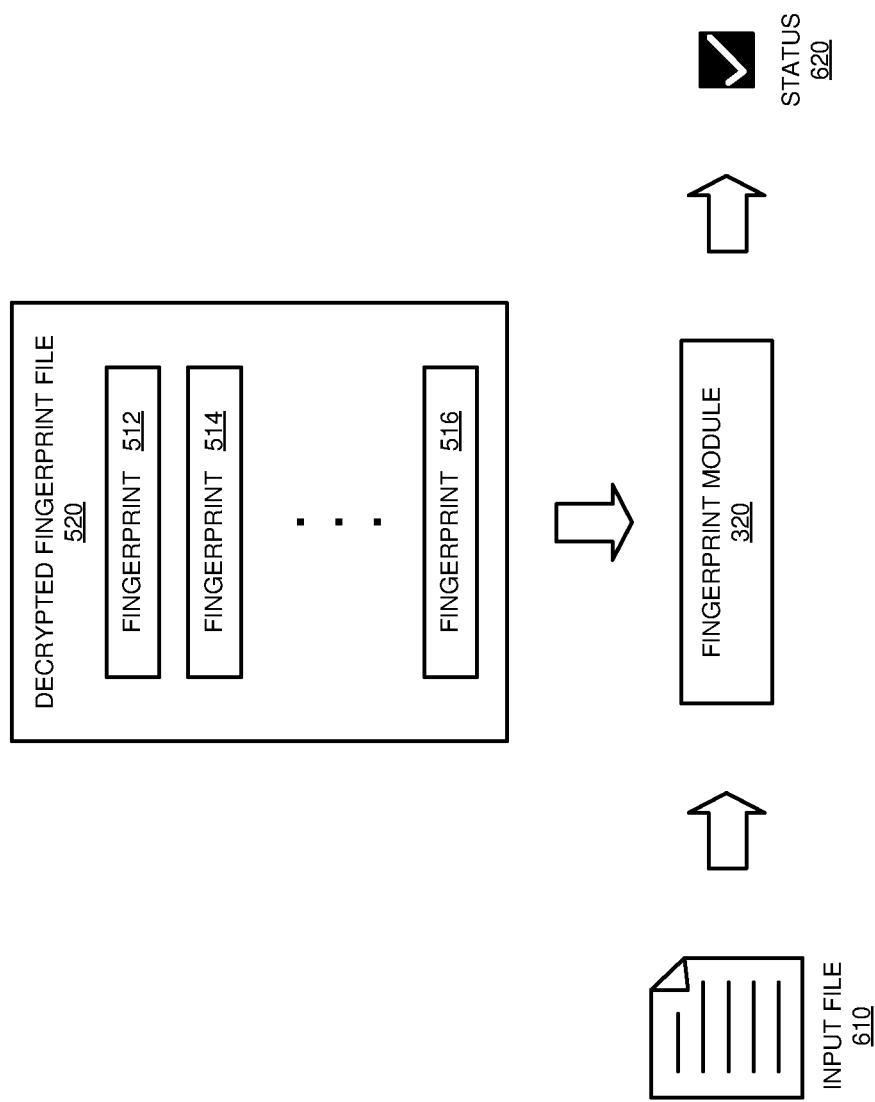
FIG. 6 depicts a continued example configuration of preventing untrusted script execution in accordance with an illustrative embodiment.

With reference to FIG. 6, this figure depicts a continued example configuration of preventing untrusted script execution in accordance with an illustrative embodiment. The example can be executed using application 300 in FIG. 3. Fingerprint module 320 is the same as fingerprint module 320 in FIG. 3. Decrypted fingerprint file 520 and fingerprints 512, 514, and 516 are the same as decrypted fingerprint file 520 and fingerprints 512, 514, and 516 in FIG. 5.

As depicted, input file 610 is presented for interpretation and execution. Fingerprint module 320 uses a hash function to compute a fingerprint of input file 610 in a manner described herein. Module 320 checks decrypted fingerprint file 520 for a fingerprint matching the fingerprint of file 610, in a manner described herein. If a fingerprint in decrypted fingerprint file 520 matches the fingerprint of file 610, input file 610 has not been modified since being received, and can still be trusted, as indicated by status 620. Consequently, application 300 executes the now-trusted script file.

Figure 7:
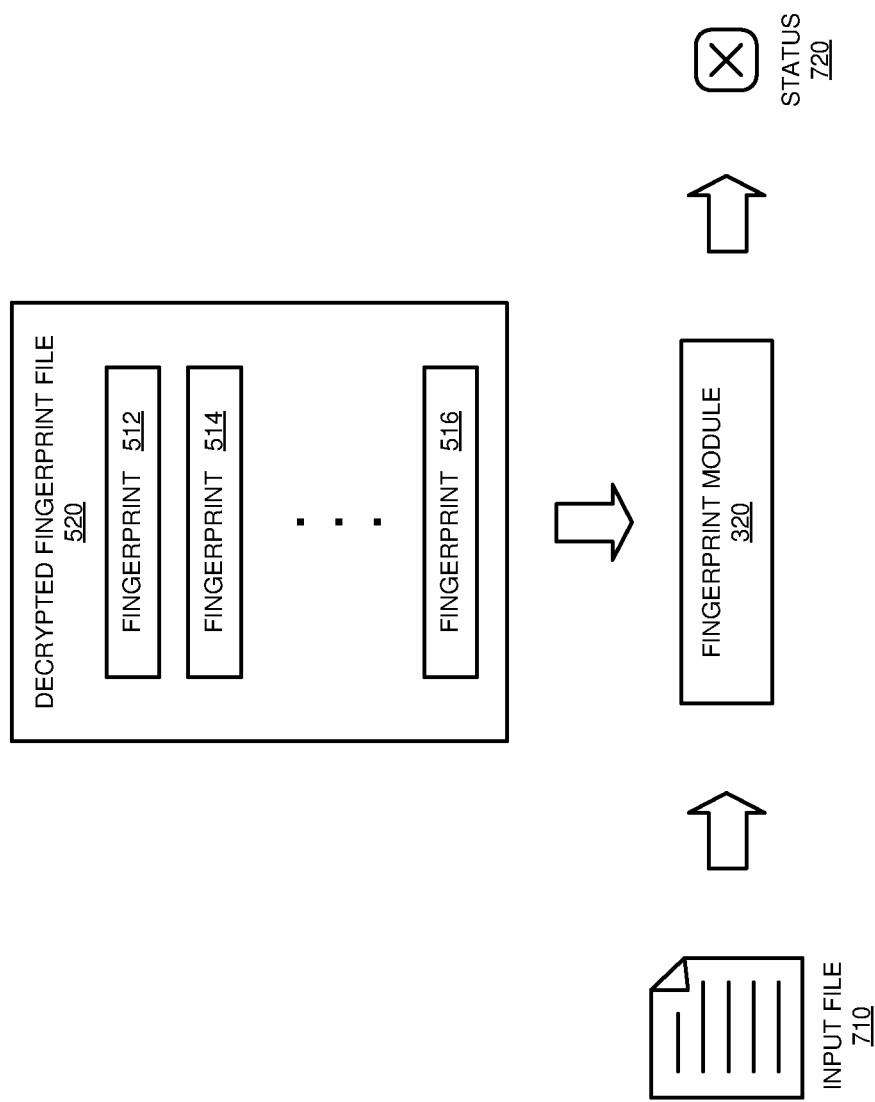
FIG. 7 depicts a continued example configuration of preventing untrusted script execution in accordance with an illustrative embodiment.

With reference to FIG. 7, this figure depicts a continued example configuration of preventing untrusted script execution in accordance with an illustrative embodiment. The example can be executed using application 300 in FIG. 3. Fingerprint module 320 is the same as fingerprint module 320 in FIG. 3. Decrypted fingerprint file 520 and fingerprints 512, 514, and 516 are the same as decrypted fingerprint file 520 and fingerprints 512, 514, and 516 in FIG. 5.

As depicted, input file 710 is presented for interpretation and execution. Fingerprint module 320 uses a hash function to compute a fingerprint of input file 710 in a manner described herein. Module 320 checks decrypted fingerprint file 520 for a fingerprint matching the fingerprint of file 710, in a manner described herein. Here, unlike the example depicted in FIG. 6, there is no matching fingerprint in decrypted fingerprint file 520, indicated by status 720. Consequently, input file 710 cannot be trusted and is prevented from execution.

Figure 8:
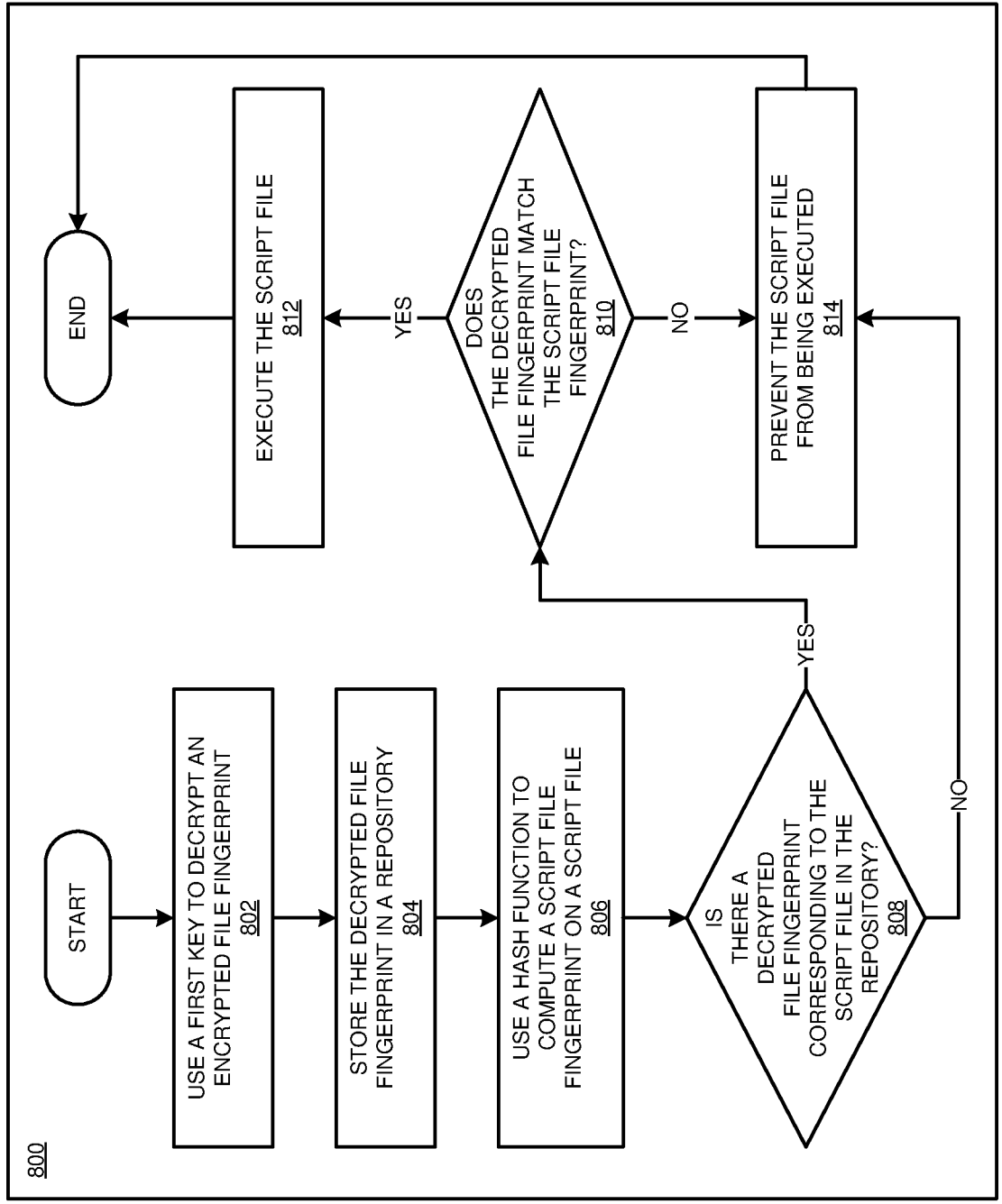
FIG. 8 depicts a flowchart of an example process for preventing untrusted script execution in accordance with an illustrative embodiment.

With reference to FIG. 8, this figure depicts a flowchart of an example process for preventing untrusted script execution in accordance with an illustrative embodiment. Process 800 can be implemented in application 300 in FIG. 3.

In block 802, the application uses a first key to decrypt an encrypted file fingerprint. In block 804, the application stores the decrypted file fingerprint in a repository. In block 806, the application uses a hash function to compute a script file fingerprint on a script file. In block 808, the application checks whether there is a decrypted file fingerprint corresponding to the script file in the repository. If yes ("YES" path of block 808), in block 810 the application checks whether the decrypted file fingerprint matches the script file fingerprint. If yes ("YES" path of block 810), in block 812 the application executes the script file, then ends. Otherwise ("NO" paths of blocks 808 and 810, in block 814 the application prevents the script file from being executed, then ends.

Figure 9:
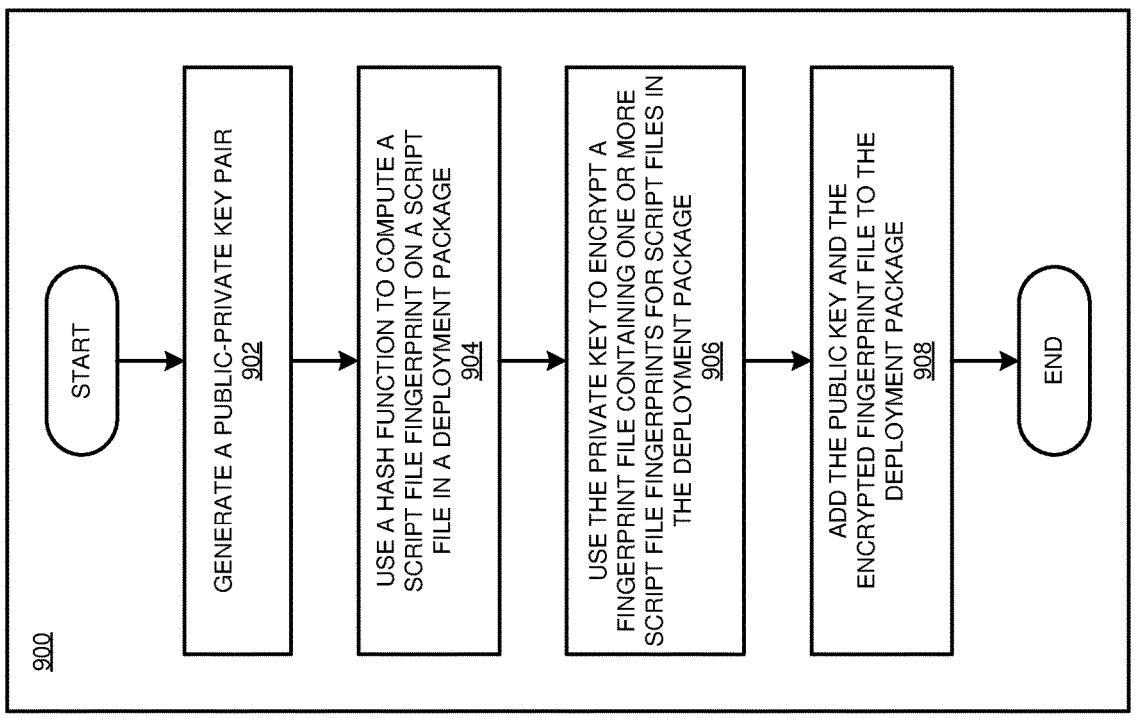
FIG. 9 depicts a flowchart of an example process for use in preventing untrusted script execution in accordance with an illustrative embodiment.

With reference to FIG. 9, this figure depicts a flowchart of an example process for use in preventing untrusted script execution in accordance with an illustrative embodiment. Process 900 can be implemented in application 400 in FIG. 4.

In block 902, the application generates a public-private key pair. In block 904, the application uses a hash function to compute a script file fingerprint on a script file in a deployment package. In block 906, the application uses the private key to encrypt a fingerprint file containing one or more script file fingerprints for script files in the deployment package. In block 908, the application adds the public key and the encrypted fingerprint file to the deployment package. Then the application ends.

Thus, a computer implemented method, system or apparatus, and computer program product are provided in the illustrative embodiments for preventing untrusted script execution and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    decrypting, using a first key, an encrypted file fingerprint, the decrypting resulting in a decrypted file fingerprint, the encrypted file fingerprint comprising an encrypted version of a fingerprint of a received file, the fingerprint of the received file comprising a bit string uniquely identifying the received file, the received file comprising first source code written in an interpreted computer language and intended to be executed by an interpreter of the interpreted computer language, the encrypted file fingerprint and the received file received as part of a script file deployment package;
    computing, by using a hash function on a script file, a script file fingerprint, the script file comprising second source code written in the interpreted computer language, the script file intended to be executed by the interpreter, the script file fingerprint comprising a bit string uniquely identifying the script file; and
    executing, responsive to the script file fingerprint matching the decrypted file fingerprint, the script file.

2. The computer-implemented method of claim 1, further comprising:
    preventing, responsive to the script file fingerprint not matching the decrypted file fingerprint, the script file from executing.

3. The computer-implemented method of claim 1, wherein the encrypted file fingerprint is encrypted using a second key, the first key comprising a public key of a public-private key pair, the second key comprising a private key of the public-private key pair.

4. The computer-implemented method of claim 3, wherein the second key is received as part of the script file deployment package.

5. The computer-implemented method of claim 1, wherein the decrypted file fingerprint comprises a result computed using the hash function on a trusted file.

6. The computer-implemented method of claim 1, wherein the decrypted file fingerprint is stored in a repository of file fingerprints.

7. A computer program product for preventing untrusted script execution, the computer program product comprising:
    one or more computer readable storage media, and program instructions collectively stored on the one or more computer readable storage media, the program instructions comprising:
        program instructions to decrypt, using a first key, an encrypted file fingerprint, the decrypting resulting in a decrypted file fingerprint, the encrypted file fingerprint comprising an encrypted version of a fingerprint of a received file, the fingerprint of the received file comprising a bit string uniquely identifying the received file, the received file comprising first source code written in an interpreted computer language and intended to be executed by an interpreter of the interpreted computer language, the encrypted file fingerprint and the received file received as part of a script file deployment package;

program instructions to compute, by using a hash function on a script file, a script file fingerprint, the script file comprising second source code written in the interpreted computer language, the script file intended to be executed by the interpreter, the script file fingerprint comprising a bit string uniquely identifying the script file; and program instructions to execute, responsive to the script file fingerprint matching the decrypted file fingerprint, the script file.

8. The computer program product of claim 7, further comprising:

program instructions to prevent, responsive to the script file fingerprint not matching the decrypted file fingerprint, the script file from executing.

9. The computer program product of claim 7, wherein the encrypted file fingerprint is encrypted using a second key, the first key comprising a public key of a public-private key pair, the second key comprising a private key of the public-private key pair.

10. The computer program product of claim 9, wherein the second key is received as part of the script file deployment package.

11. The computer program product of claim 7, wherein the decrypted file fingerprint comprises a result computed using the hash function on a trusted file.

12. The computer program product of claim 7, wherein the decrypted file fingerprint is stored in a repository of file fingerprints.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. A computer system comprising one or more processors, one or more computer-readable memories, and one or more computer-readable storage media, and program instructions stored on at least one of the one or more storage devices for execution by at least one of the one or more processors via at least one of the one or more memories, the stored program instructions comprising:

program instructions to decrypt, using a first key, an encrypted file fingerprint, the decrypting resulting in a decrypted file fingerprint, the encrypted file fingerprint comprising an encrypted version of a fingerprint of a received file, the fingerprint of the received file comprising a bit string uniquely identifying the received file, the received file comprising first source code written in an interpreted computer language and intended to be executed by an interpreter of the interpreted computer language, the encrypted file fingerprint and the received file received as part of a script file deployment package;

program instructions to compute, by using a hash function on a script file, a script file fingerprint, the script file comprising second source code written in the interpreted computer language, the script file intended to be executed by the interpreter, the script file fingerprint comprising a bit string uniquely identifying the script file; and program instructions to execute, responsive to the script file fingerprint matching the decrypted file fingerprint, the script file.

16. The computer system of claim 15, further comprising:

program instructions to prevent, responsive to the script file fingerprint not matching the decrypted file fingerprint, the script file from executing.

17. The computer system of claim 15, wherein the encrypted file fingerprint is encrypted using a second key, the first key comprising a public key of a public-private key pair, the second key comprising a private key of the public-private key pair.

18. The computer system of claim 17, wherein the second key is received as part of the script file deployment package.

19. The computer system of claim 15, wherein the decrypted file fingerprint comprises a result computed using the hash function on a trusted file.

20. The computer system of claim 15, wherein the decrypted file fingerprint is stored in a repository of file fingerprints.

* * * * *